United States Patent
Eyrainer

(10) Patent No.: US 6,302,436 B1
(45) Date of Patent: Oct. 16, 2001

(54) PROTECTION SYSTEM AGAINST LATERAL COLLISIONS FOR VEHICLE OCCUPANTS

(75) Inventor: Heinz Eyrainer, Waldstetten (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/423,406
(22) PCT Filed: May 13, 1998
(86) PCT No.: PCT/EP98/02839
   § 371 Date: Nov. 4, 1999
   § 102(e) Date: Nov. 4, 1999
(87) PCT Pub. No.: WO98/51541
   PCT Pub. Date: Nov. 19, 1998

(30) Foreign Application Priority Data

May 13, 1997 (DE) .......... 297 08 494 U

(51) Int. Cl.⁷ .................. B60R 21/22
(52) U.S. Cl. ..................... 280/730.2
(58) Field of Search ............ 280/730.2, 730.1, 280/728.1, 729

(56) References Cited

U.S. PATENT DOCUMENTS 5,251,931 * 10/1993 Semchena et al. ........ 280/730.1
5,333,899   8/1994 Witte .
5,447,326 *  9/1995 Laske et al. .............. 280/730.2
5,678,852 * 10/1997 Brown et al. ............. 280/730.2

FOREIGN PATENT DOCUMENTS 2856437    7/1980 (DE) .
4304152    8/1993 (DE) .
0411979    2/1991 (EP) .
4-356245 * 12/1992 (JP) .................. 280/730.2

* cited by examiner

Primary Examiner—Peter C. English
(74) Attorney, Agent, or Firm—Tarolli, Sundheim, Covell, Tummino & Szabo L.L.P.

(57) ABSTRACT

A protective system is proposed for an optimum protection of a vehicle occupant against lateral effects, which consists of a plurality of elements combined with each other. An inflatable protective cushion (18) which is supported on the side structure of the vehicle and is inflated to be very hard is provided in the pelvic region. Above it, integrated into the inner covering of the door is an impact body (14) which extends between the door rail and the arm rest. A further inflatable protective cushion (24) at the level of the door rail provides an increased protection in the thorax region in cooperation with a releasable covering part (22) acting as an impact plate. A third inflatable protective cushion (32) is provided for the head region.

9 Claims, 1 Drawing Sheet

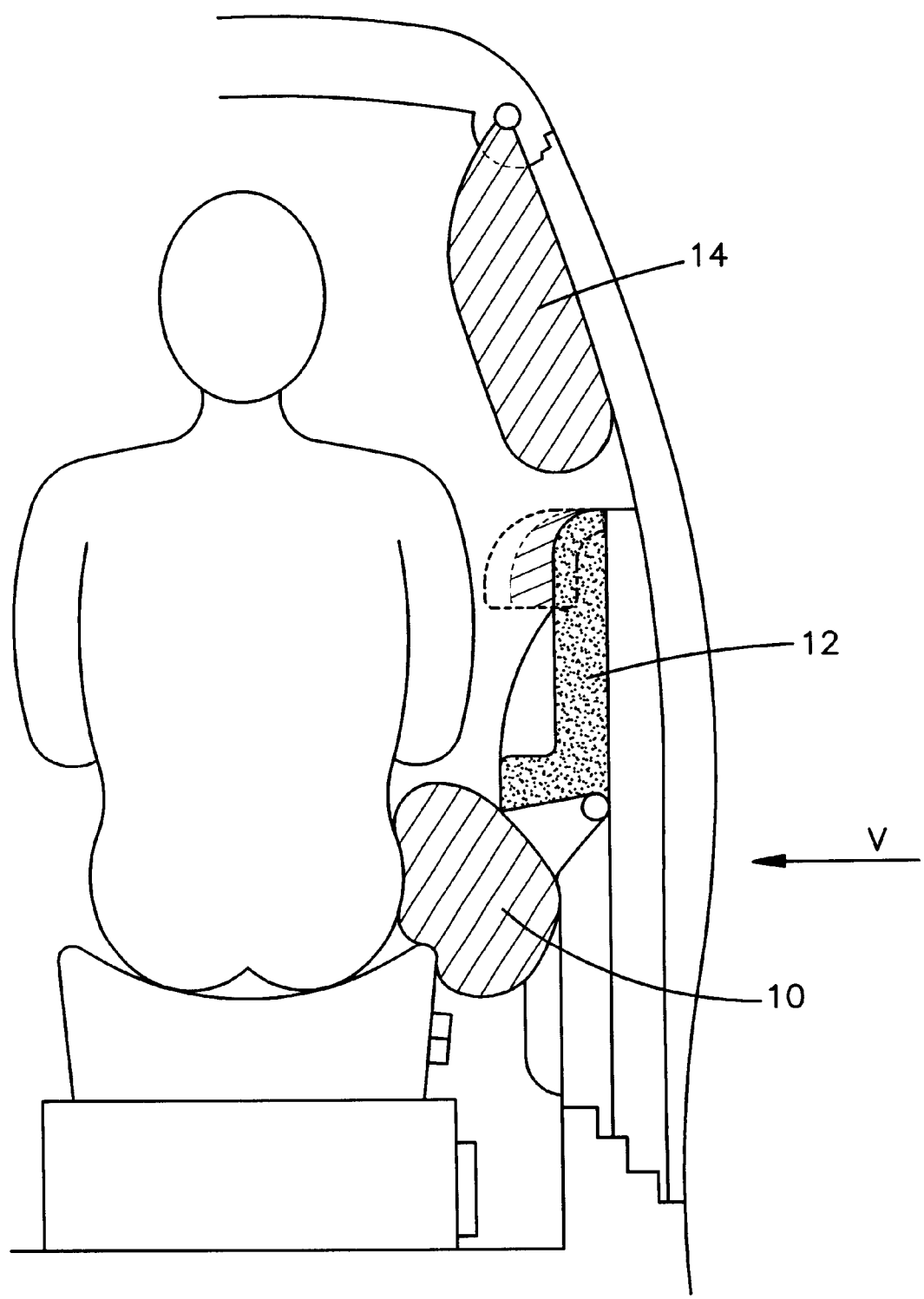

PROTECTION SYSTEM AGAINST LATERAL COLLISIONS FOR VEHICLE OCCUPANTS

BACKGROUND OF THE INVENTION

The invention relates to a side impact protective system for vehicle occupants, with an inflatable protective cushion which in the state of rest is stowed in a side door or inner side structure of the vehicle and emerges towards the occupant on activation.

Inflatable cushions for protection from injuries in the case of a side impact unfold between the vehicle occupant and the lateral delimitation of the interior of the vehicle, in particular the vehicle door. They thus prevent a direct contact of the occupant with parts of the vehicle. Inflatable protective cushions were proposed both for the head region and for the thorax region. The functionally proper unfolding of such a protective cushion, however, depends on the size, position and arm placement of the occupant. In the case of an unfavourable sitting position or posture, injuries to the occupant are possible by a suddenly unfolding protective thorax cushion.

German Published Application DE 43 04 152 A1 describes a protective device for vehicle occupants comprising side airbags, in which an airbag in the inflated state extends at the level of the pelvic region of the occupant and is supported laterally on the exterior on the side door. In the state of rest the airbag is stowed in the vehicle seat below the seating surface and emerges in an upward direction between the side door and the vehicle occupant on an activation. If the vehicle occupant is seated too close to the side door, the airbag can not be deployed between the side door and the vehicle occupant or can only be deployed to a smaller volume than provided for, and on penetration of the vehicle door into the interior of the vehicle, as a result of a side impact, no or only little protective effect is provided.

BRIEF SUMMARY OF THE INVENTION

The invention provides a side impact protective system for vehicle occupants, by which a correction to the sitting position is achieved in the sense of a sufficient distance from the lateral delimitation of the vehicle interior. According to the invention, the protective cushion in the inflated state extends at the level of the pelvic region of the occupant, is supported laterally on the exterior in the lower region of the vehicle door or side structure and has a hardness such that on penetration of the vehicle door into the interior of the vehicle, as a result of a side impact, the occupant on the vehicle seat is shifted towards the interior of the vehicle. Through this step, a reduction is achieved of the relative velocity between the door and the occupant in the course of the side impact. Through the reduced relative velocity, injuries particularly in the thorax region are prevented. In addition, the protective cushion dampens the forces acting on the occupant from the side.

An improved protective effect is achieved according to the preferred embodiment by a padding body being integrated into the covering of the vehicle door or side structure above the protective cushion, which padding body extends up to the level of the thorax region of the occupant. In addition, an inflatable protective cushion covering the head region of the occupant is preferably provided, which is supported on the inner side structure of the vehicle. This additional inflatable protective cushion can develop an increased protective effect in conjunction with the protective cushion in the pelvic region.

The protective cushion unfolding at the level of the pelvic region of the occupant must be inflated with a particularly high internal pressure so as to be able to move the occupant towards the interior of the vehicle in addition to the damping of the impact in the abdominal region. Accordingly, the inflation pressure for the protective cushion in the pelvic region is preferably about 1 to 1.5 bar. While with such a pressure the protective cushion is very hard, this does not present a risk because the cushion acts only on the pelvic region of the occupant, i.e. a region which is capable of taking great mechanical stresses.

A substantial increase in the protective effect of the side impact protective system is reached by a further development of the invention in which a further inflatable protective cushion is provided at the level of the thorax region of the occupant, arranged under a covering part of the lateral vehicle structure. On activation of the protective cushion the covering part is released from the vehicle structure and remains connected with the protective cushion like an impact plate.

The invention has some particular advantages. These include the possibility of free unfolding of the protective cushion because no disturbing contours such as, for example, occupant's arms, seat rest etc. are in the way in the region between the pelvis and the door. Also, the inflating protective cushion creates no risk of injury because the impact region of the occupant is situated outside the region of his soft parts, in particular ribs and abdomen. The cooperation of the seat shell and the protective cushion results in an optimum correction of the seating position as required. The cover on the door liner, opening with the unfolding of the protective cushion, does also not represent any danger because it is situated beneath the arm rest, outside the possible region of contact with the occupant.

In particular the combination with the padding body in the vehicle door and with the protective head cushion produces an extremely effective side impact protective system.

BRIEF DESCRIPTION OF THE DRAWING

Further special features of the invention will be apparent from the dependent claims and from the following description of a preferred embodiment with reference to the drawing the single FIGURE of which diagrammatically shows the side impact protective system in the activated condition.

DETAILED DESCRIPTION OF THE INVENTION

The FIGURE shows the occupant sitting on a vehicle seat 10 next to a side door 12 of the vehicle. Integrated into the inner covering of the door is a padding body 14 which extends from the door rail as far as beneath the level of the arm rest and preferably consists of a foam or honeycomb structure. A supporting housing 16 is disposed underneath this impact body 14 for accommodating a gas bag 18 which is adapted to be inflated by a gas generator 20 and is depicted in the FIGURE in the inflated condition. In this condition the gas bag 18 extends at the level of the pelvic region of the occupant.

A covering part 22 is integrated into the impact body 14 which is releasably secured to the impact body and covers an underlying protective cushion 24 which is folded up into a very flat shape. The covering part 22 which is bent into the general shape of an L is located at the level of the door rail. In the illustrated embodiment the protective cushion 24 shown in the FIGURE in the inflated state is filled by the same gas generator 20 which also fills the protective cushion 18 for the pelvic region. For this purpose a connecting tube extends from the gas generator 20 and opens into the interior of the protective cushion 24. While the covering part 22 is released from the impact body 14 on activation of the protective cushion 24, it remains connected with the impact body 14 by means of a plurality of flexible retaining straps 28, 30. The retaining straps 28, 30 have a tying and guiding function; they cause the covering part 22 to be displaced approximately parallel in the course of the expansion of the protective cushion 24.

Finally, the protective system includes a third protective cushion 32 which in the rest condition is received above the roof edge and in the activated condition extends in the region of the occupant's head beside the inner side structure of the vehicle, more particularly the side window. This gas bag 32 may be filled separately or likewise by the common gas generator 20.

It is apparent from the FIGURE that the occupant is protected against lateral effects in an optimum manner by the four components of the protective system, namely, protective cushion 18 in the pelvic region;

impact body 14 in the thorax region;

protective cushion 24 with covering part 22 acting as an impact plate; and protective cushion 32 for head protection.

The protective cushion 18 for the pelvic region is inflated to a very high pressure in the range of 1 to 1.5 bar. It is thus able to correct the sitting position of the occupant, in particular in cooperation with the seat shell of the vehicle seat. Although the protective cushion 18 has a great hardness when inflated to the high pressure mentioned before, its influence remains limited to the pelvic region of the occupant where there are no highly vulnerable parts of the body.

In the area between the door rail and the arm rest the impact body 14 dampens the forces acting laterally on the occupant in the thorax region. Force peaks are absorbed by dissipation in the impact body 14. In addition, the protective cushion 24 with the covering part 22 acting as an impact plate keeps the upper thorax region of the occupant at a distance from the inner side of the vehicle door 12. The protective cushion 24 has a low depth of deployment and can be unfolded very quickly. The covering part 22 results in an introduction of forces from the occupant into the protective cushion 24 over a large area.

The protective cushion 32 for the head region extends almost as far as to the level of the door rail. Accordingly, a continuous lateral protection of the occupant between the head and the pelvic region is provided, thus ensuring optimum protection.

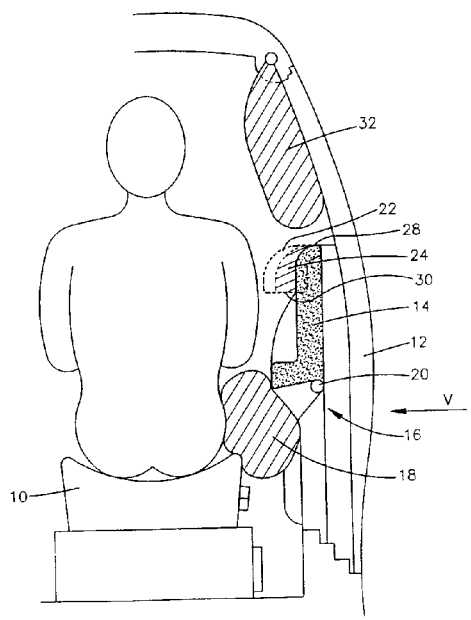

What is claimed is:

1. A side impact protective system for a vehicle occupant with an inflatable protective cushion (18) which in an inflated state extends at the level of the pelvic region of the occupant and is supported laterally on the exterior on a side door (12) or the inner side structure of the vehicle, characterized in that the protective cushion (18) in a state of rest is stowed in the side door (12) or the inner side structure of the vehicle, emerges towards the occupant on activation, and is inflated to a very high pressure such that on penetration of the vehicle door into the interior of the vehicle, as a result of a side impact, the occupant on a vehicle seat is shifted towards the interior of the vehicle by the protective cushion.

2. The side impact protection system according to claim 1, characterized in that a padding body (14) is integrated into a covering of the vehicle door (12) or side structure above the protective cushion (18), which padding body (14) extends up to the level of the thorax region of the occupant.

3. The side impact protective system according to claim 1, characterized in that in addition an inflatable protective cushion (32) is provided which covers the head region of the occupant and is supported on an inner side structure of the vehicle.

4. The side impact protective system according to claim 1, characterized in that a second inflatable protective cushion (24) is disposed under a covering part (22) of the vehicle door or side structure at the level of the thorax region of the occupant.

5. The side impact protective system according to claim 4, characterized in that on activation of the second protective cushion (24) the covering part (22) is released out of the vehicle door or side structure and remains connected with the second protective cushion (24) to serve as an impact plate.

6. The side impact protective system according to claim 5, characterized in that the covering part (22) is tied and guided on the vehicle door or side structure by retaining straps (28, 30).

7. The side impact protective system according to claim 4, characterized in that the covering part (22) forms a door rail.

8. The side impact protective system according to claim 1, characterized in that the inflation pressure of the protective cushion (18) extending at the level of the pelvic region amounts to about 1 to 1.5 bar.

9. The side impact protective system according to claim 1, characterized in that at least two inflatable protective cushions (18, 24, 32) are filled by a common gas source (20).

* * * * *

UNITED STATES PATENT AND TRADEMARK OFFICE
CERTIFICATE OF CORRECTION

PATENT NO. : 6,302,436 B1
DATED : October 16, 2001
INVENTOR(S) : Heinz Eyrainer

It is certified that error appears in the above-identified patent and that said Letters Patent is hereby corrected as shown below:

Title page,
Should be deleted and substitute therefore the attached title page as shown on the attached page.

Signed and Sealed this

Thirty-first Day of August, 2004

JON W. DUDAS
*Director of the United States Patent and Trademark Office*

United States Patent
Eyrainer

(10) Patent No.: US 6,302,436 B1
(45) Date of Patent: Oct. 16, 2001

(54) PROTECTION SYSTEM AGAINST LATERAL COLLISIONS FOR VEHICLE OCCUPANTS

(75) Inventor: Heinz Eyrainer, Waldstetten (DE)

(73) Assignee: TRW Occupant Restraint Systems GmbH & Co. KG, Alfdorf (DE)

(*) Notice: Subject to any disclaimer, the term of this patent is extended or adjusted under 35 U.S.C. 154(b) by 0 days.

(21) Appl. No.: 09/423,406

(22) PCT Filed: May 13, 1998

(86) PCT No.: PCT/EP98/02839

§ 371 Date: Nov. 4, 1999

§ 102(e) Date: Nov. 4, 1999

(87) PCT Pub. No.: WO98/51541

PCT Pub. Date: Nov. 19, 1998

(30) Foreign Application Priority Data

May 13, 1997 (DE) .......................... 297 08 494 U

(51) Int. Cl.$^7$ .......................................... B60R 21/22
(52) U.S. Cl. .......................................... 280/730.2
(58) Field of Search .......................... 280/730.2, 730.1, 280/728.1, 729

(56) References Cited

U.S. PATENT DOCUMENTS

| | | |
|---|---|---|
| 5,251,931 * | 10/1993 | Semchena et al. .......... 280/730.1 |
| 5,333,899 | 8/1994 | Witte |
| 5,447,326 * | 9/1995 | Laske et al. .......... 280/730.2 |
| 5,678,852 * | 10/1997 | Brown et al. .......... 280/730.2 |

FOREIGN PATENT DOCUMENTS

| | | |
|---|---|---|
| 2856437 | 7/1980 | (DE) . |
| 4304152 | 8/1993 | (DE) . |
| 0411979 | 2/1991 | (EP) . |
| 4-356245 * | 12/1992 | (JP) .......... 280/730.2 |

* cited by examiner

*Primary Examiner*—Peter C. English
(74) *Attorney, Agent, or Firm*—Tarolli, Sundheim, Covell, Tummino & Szabo L.L.P.

(57) ABSTRACT

A protective system is proposed for an optimum protection of a vehicle occupant against lateral effects, which consists of a plurality of elements combined with each other. An inflatable protective cushion (18) which is supported on the side structure of the vehicle and is inflated to be very hard is provided in the pelvic region. Above it, integrated into the inner covering of the door is an impact body (14) which extends between the door rail and the arm rest. A further inflatable protective cushion (24) at the level of the door rail provides an increased protection in the thorax region in cooperation with a releasable covering part (22) acting as an impact plate. A third inflatable protective cushion (32) is provided for the head region.

9 Claims, 1 Drawing Sheet